United States Patent [19]

Sharpe

[11] 4,194,707
[45] Mar. 25, 1980

[54] LIFT AUGMENTING DEVICE FOR AIRCRAFT

[76] Inventor: Thomas H. Sharpe, 502 Dorr Ave., Belvedere, S.C. 29841

[21] Appl. No.: 861,269

[22] Filed: Dec. 16, 1977

[51] Int. Cl.² .................... B64C 29/00; B64C 39/00
[52] U.S. Cl. ..................... 244/9; 244/12.3;
244/12.5; 244/208; 244/53 B; 416/108; 416/111
[58] Field of Search ............... 244/9, 10, 11, 13, 19, 244/20, 21, 22, 23 D, 39, 206, 110 B, 12 S, 12.1, 53 B, 12.3, 208; 416/108, 110, 111

[56] References Cited

U.S. PATENT DOCUMENTS

| | | | |
|---|---|---|---|
| 1,753,252 | 4/1930 | Strandgren | 416/108 |
| 2,004,961 | 6/1935 | Platt | 244/20 |
| 2,123,916 | 7/1938 | Rohrbach | 244/20 |
| 2,344,515 | 3/1944 | Massey | 244/10 |
| 2,951,660 | 9/1960 | Giliberty | 244/23 D |
| 3,065,928 | 11/1962 | Dornier | 244/10 |
| 3,178,131 | 4/1965 | Laing | 244/206 |
| 3,292,864 | 12/1966 | Edkins | 244/23 D |
| 3,871,602 | 3/1975 | Kissinger | 244/13 |
| 3,907,219 | 9/1975 | Pharris | 244/12.5 |

FOREIGN PATENT DOCUMENTS

| | | | |
|---|---|---|---|
| 581242 | 8/1958 | Italy | 244/12.1 |
| 369249 | 3/1932 | United Kingdom | 244/9 |

*Primary Examiner*—Galen L. Barefoot
*Attorney, Agent, or Firm*—B. J. Powell

[57] ABSTRACT

A lift augmenting device to provide a vertical take-off capability in aircraft which includes a pair of rotor assemblies with independently individually pivoted rotor vanes so that the attitude of the vanes can be changed at different positions along the circumferential rotational path of the vanes as they rotate with the rotor assemblies to pump air therethrough and selectively generate lift on the aircraft.

9 Claims, 9 Drawing Figures

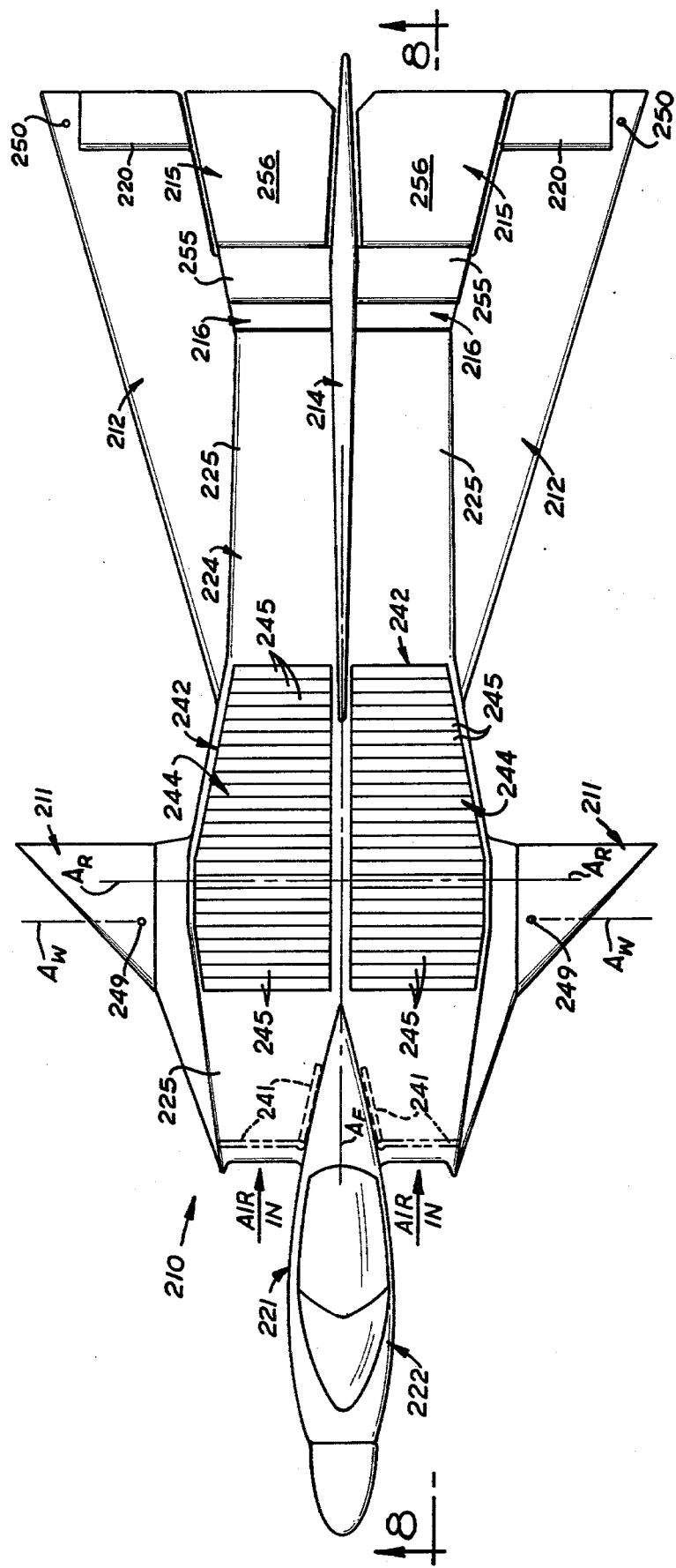

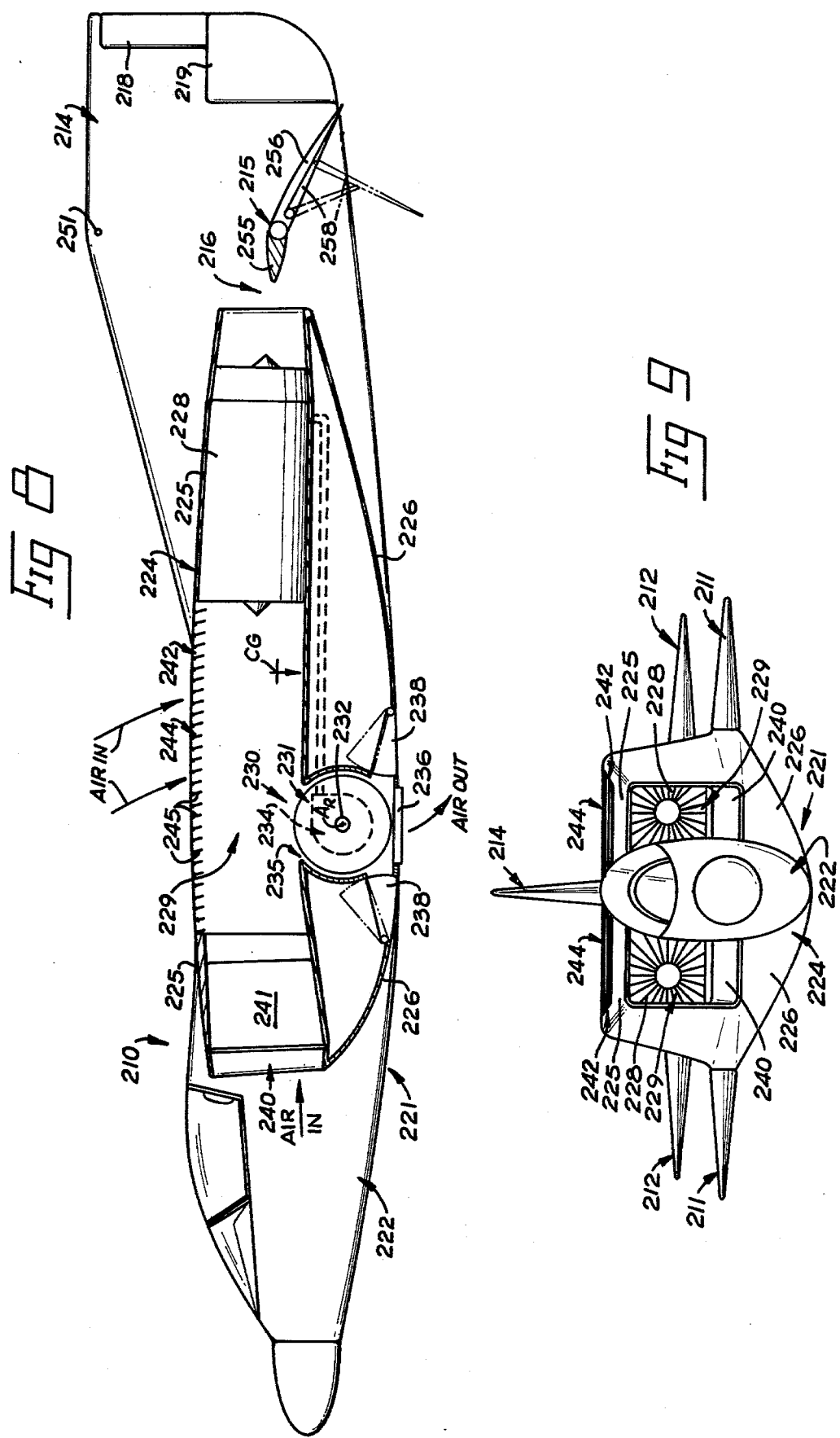

LIFT AUGMENTING DEVICE FOR AIRCRAFT

BACKGROUND OF THE INVENTION

Various devices have been suggested in the past for augmenting the lift on an aircraft either to reduce the required wing area or to decrease the required forward speed of the aircraft during take-off and landing. Such devices have not enjoyed widespread success due primarily to the fact that such devices have had difficulty in providing adequate control over the aircraft at low speed, especially when vertical take-offs and landings were attempted. One type of suggested lift augmenting device uses rotors positioned in the wings. Examples of this type of lift augmenting device are shown in U.S. Pat. Nos. 2,344,515 and 3,065,928. These rotors are fixed vanes in the rotors making it difficult to vary the flow of air through the rotors.

SUMMARY OF THE INVENTION

These and other problems and disadvantages associated with the prior art are overcome by the invention disclosed herein by the provision of rotor assemblies on opposite sides of the aircraft flight axis in communication with the air above and below the aircraft. The vanes on the rotor assemblies are each individually pivoted so that the rotor vanes can be pivoted in one direction to draw air into the rotor assembly while the vanes in communication with the air above the aircraft and can be pivoted in the opposite direction to discharge air from within the rotor assembly while the vanes are in communication with the air below the aircraft to exert lift on the aircraft. The vanes on both the rotor assemblies can be simultaneously oriented in the same sense and degree of pivoting or can be pivoted in the opposite sense. This allows the rotor assemblies to be selectively controlled so as to give the aircraft a vertical take-off and landing capability.

These and other features and advantages of the invention will become more fully understood upon consideration of the following description and the accompanying drawings wherein like characters of reference designate corresponding parts throughout the several views and in which:

BRIEF DESCRIPTION OF THE DRAWINGS

FIG. 7 is a top plan view of a second aircraft embodying the invention;

FIG. 8 is a view taken generally along line 8—8 in FIG. 7; and,

FIG. 9 is a front view of the second aircraft.

These figures and the following detailed description disclose specific embodiments of the invention; however, it is to be understood that the inventive concept is not limited thereto since it may be embodied in other forms.

DETAILED DESCRIPTION OF ILLUSTRATIVE EMBODIMENTS

Figure 1:
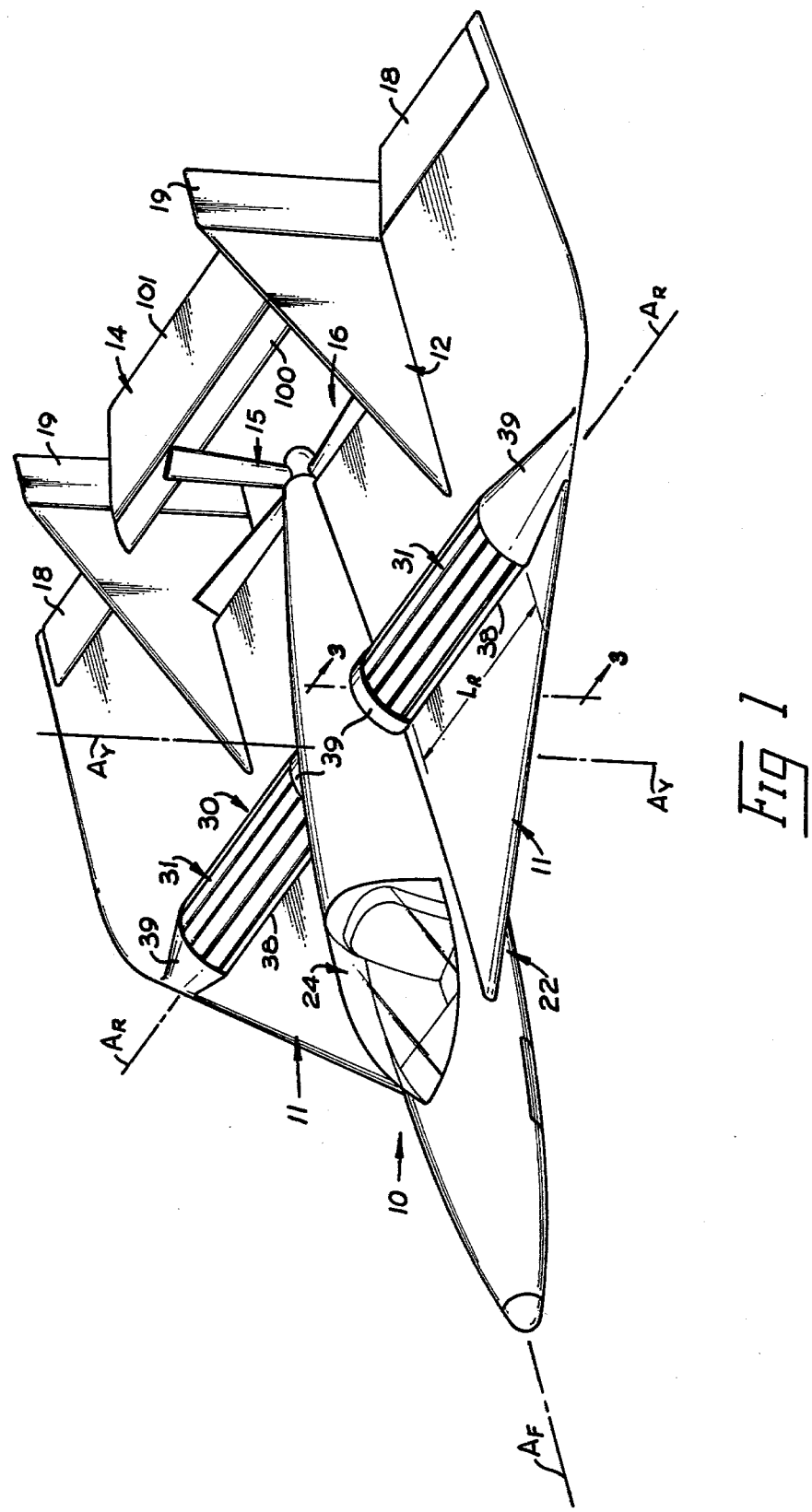
FIG. 1 is a perspective view of an aircraft embodying the invention.
Figure 2:
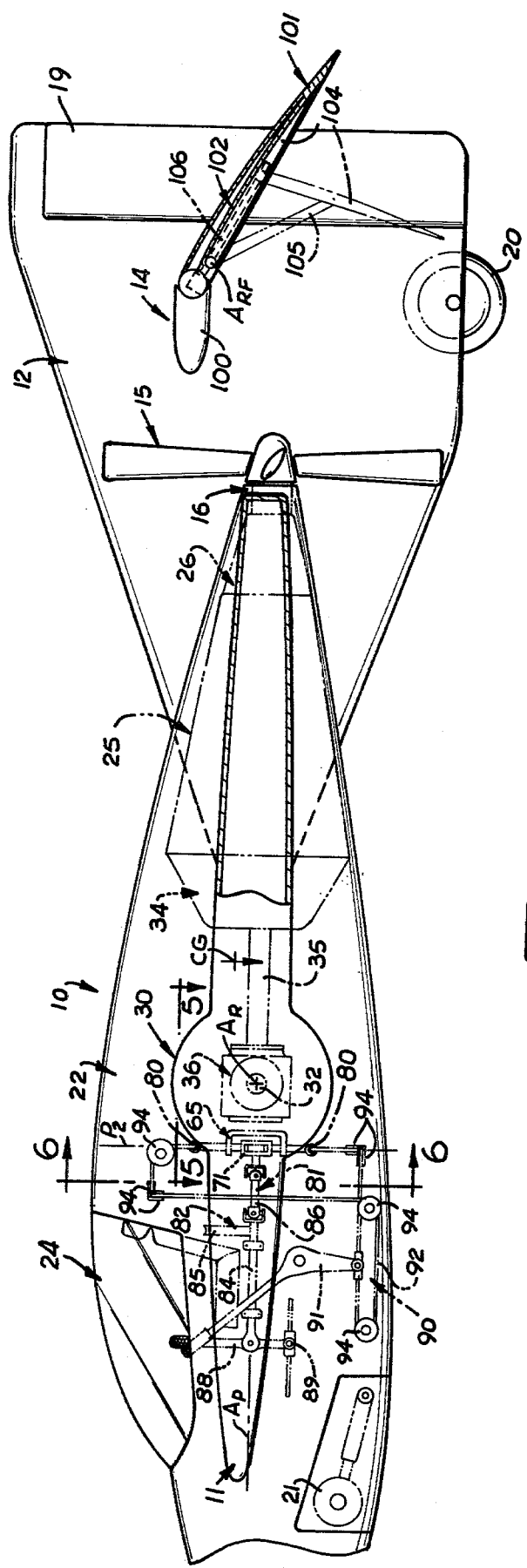
FIG. 2 is a partial side view of the aircraft of FIG. 1 with some of the internal components thereof shown in phantom lines.

As seen in FIG. 1, the invention is embodied in an aircraft 10 with delta wings 11, a pair of vertical stabilizers 12, and an elevator 14 extending between the vertical stabilizers 12. The forward flight of the aircraft 10 is powered by a propeller 15 in a cutout 16 in wings 11 between the vertical stabilizers 12 and forwardly of elevator 14. The elevator 14 is located so that a portion of the rearwardly directed airflow generated by the propeller 15 is directed across the elevator 14 as will become more apparent. The rear edges of the wings 11 outboard of the vertical stabilizers are provided with conventionally operating ailerons 18 and the vertical stabilizers 12 are provided with conventionally operating rudders 19. Rear landing wheels 20 are mounted in the bottom of the vertical stabilizers and a retractable nose wheel 21 is provided in the forward portion of the fuselage 22 as seen in FIG. 2. An appropriate pilot cockpit 24 is provided in the forward portion of fuselage 22. The fuselage 22 has a longitudinal flight axis $A_F$ along which the aircraft 10 moves in forward flight. The fuselage 22 further mounts an engine 25 shown by phantom lines in FIG. 2 forwardly of the propeller 15 for driving same.

Figure 3:
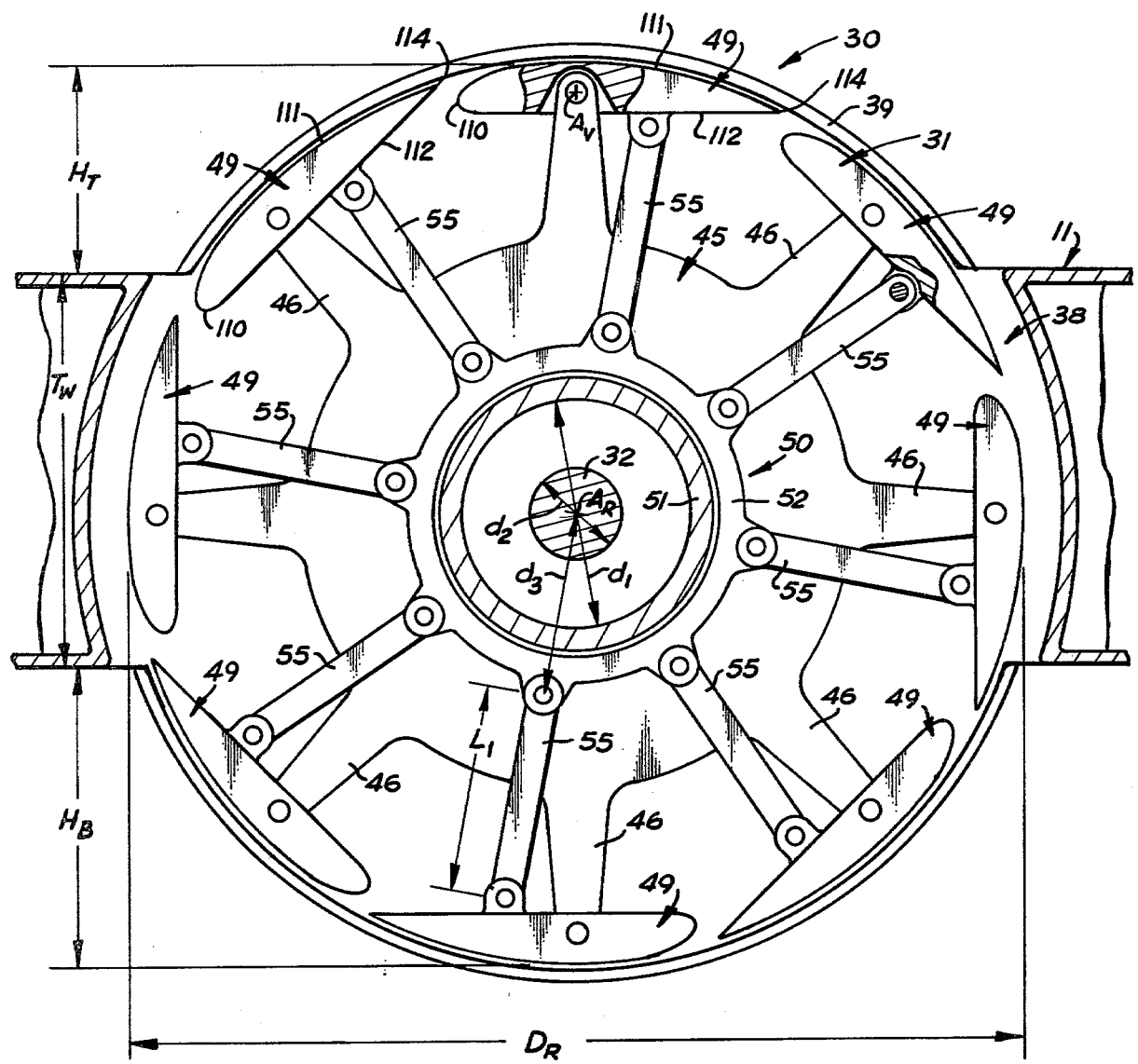
FIG. 3 is a cross-sectional view taken generally along line 3—3 in FIG. 1 showing the construction of the rotor assembly.
Figure 4:
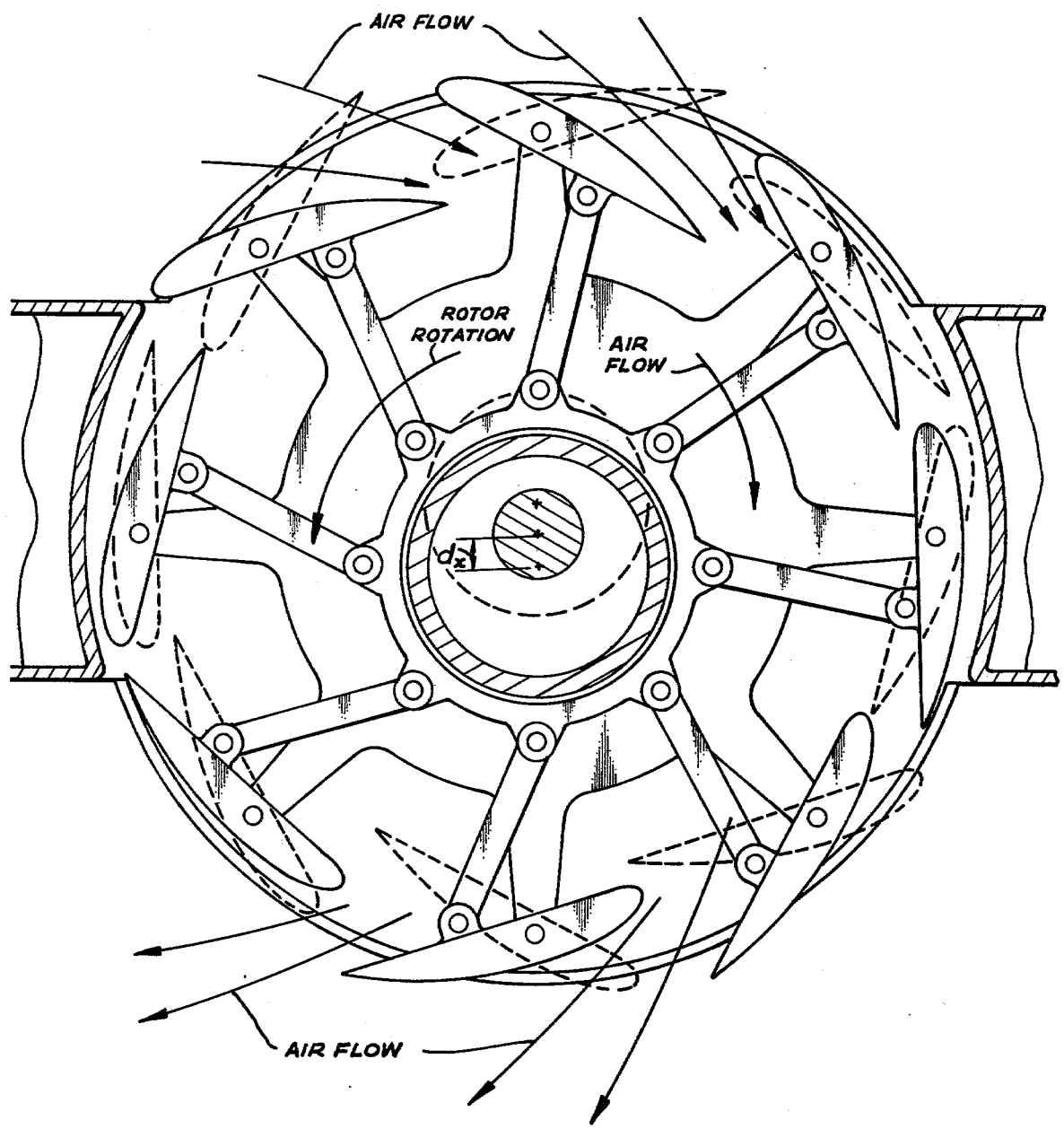
FIG. 4 is a view similar to FIG. 3 showing different operational positions of the rotor vanes in the rotor assembly.

The aircraft 10 is provided with a lift augmenting means 30 mounted in the wings 11 on opposite sides of the fuselage 22 as seen in FIG. 1. The lift augmenting means 30 includes a pair of rotor assemblies 31, one being rotatably mounted in each wing 11. The rotor assemblies 31 are rotatably mounted about a common rotational axis $A_R$ (FIGS. 1–5) normal to the flight axis $A_F$ on a common drive shaft 32 (FIGS. 3–5) which is driven by the engine 25 through a transmission 34 (FIG. 2), transfer drive shaft 35 (FIGS. 2 and 3) and right angle drive 36 (FIGS. 2–4). Each of the rotor assemblies 31 has an effective length $L_R$ and a nominal diameter $D_R$ best seen in FIGS. 1 and 3 and both are located equadistant from the flight axis $A_F$ of the aircraft as will become more apparent. Each of the rotor assemblies 31 is mounted in a rotor cutout 38 in each of the wings 11 where the wings 11 have an effective thickness $T_W$ which is less than the diameter $D_R$ of the rotor assemblies 31. Thus, it will be seen that each rotor assembly 31 projects above and below the wings 11 so that the rotor assemblies 31 are in communication with the air above and below the aircraft. Each of the rotor assemblies 31 project above the wings 11 the height $H_T$ and project below the wings 11 the height $H_B$. It will be further noted that the height $H_B$ is greater than the height $H_T$ as will become more apparent. The common drive shaft 32 mounting the rotor assemblies 31 is appropriately journaled in the wings 11 so that the drive shaft 32 and rotor assembly 31 can rotate about the rotor axis $A_R$. Appropriate fairings 39 are provided at the outboard and inboard ends of the rotor assemblies 31 to streamline the exposed ends of the rotor assemblies 31. It will be noted that the rotor assemblies 31 are rotated in the same direction so that the top of the rotor assemblies projecting above the wings 11 are moving toward the front of the fuselage 22 or counterclockwise as seen in FIG. 3. Because more of the rotor assemblies 31 are exposed more below the wings 11 than above the wings 11, the natural flow of the air flowing above and below the wings 11 will try to rotate the rotor assemblies 31 in this same direction.

Figure 5:
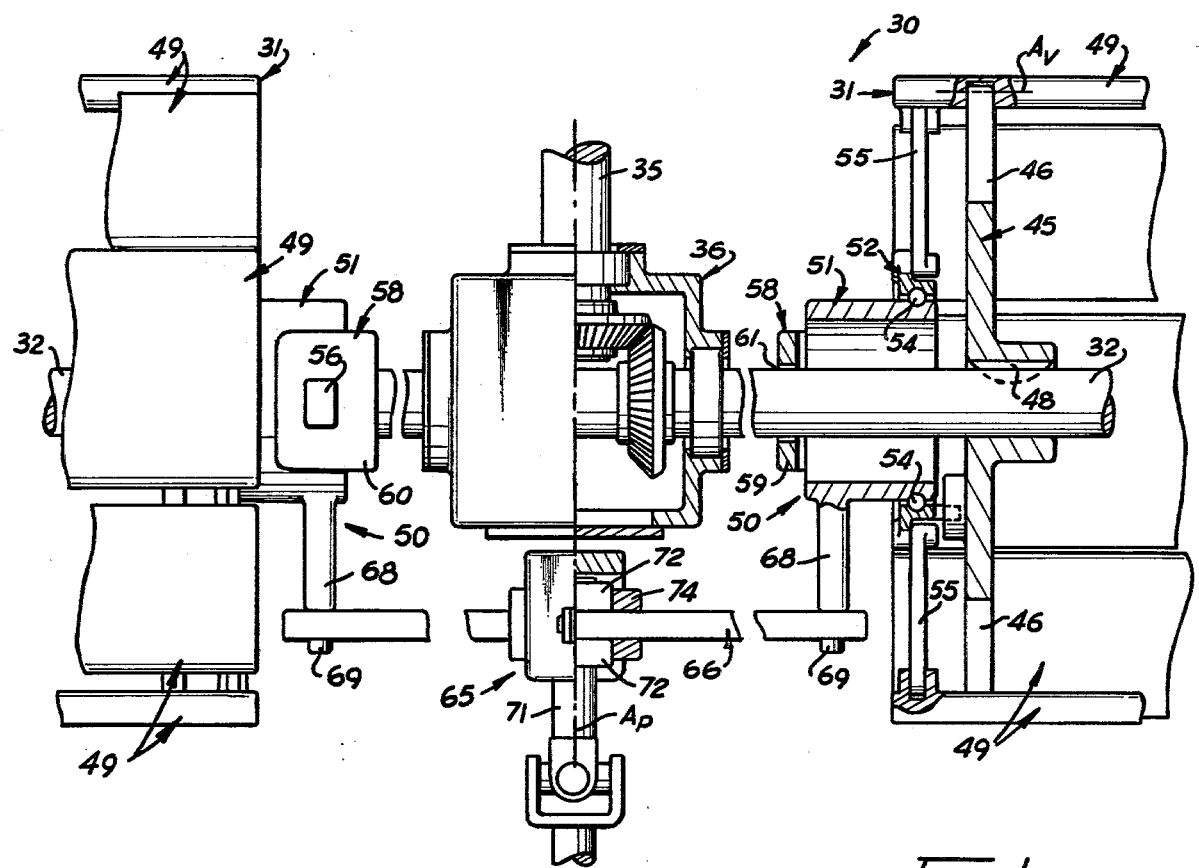
FIG. 5 is a view taken generally along line 5—5 in FIG. 2 showing the drive connection between the rotor assemblies.

Each of the rotor assemblies 31 includes a pair of spaced apart support arbors 45 mounted on the common drive shaft 32 at the opposite ends of the rotor assemblies 31 as best seen in FIGS. 3–5. Each of the support arbors 45 is provided with a plurality of radially extending support arms 46 which are equally spaced circumferentially around the arbors 45. While different numbers of support arms 46 may be provided on the arbors 45, eight such support arms are illustrated in the figures. It will be seen that each of the support arbors 45 is keyed to common drive shaft 32 through a key 48 as best seen in FIG. 4 so that the support arbors 45 are rotated with the drive shaft 32. The support arms 46 individually pivotally mount a plurality of rotor vanes 49 at the outboard ends of the support arms 46, with the rotor vanes 49 having a length about equal to the effective length $L_R$ of the rotor assemblies 31 and oriented generally parallel to the rotor axis $A_R$. It will thus be seen that each of the rotor vanes 49 is pivotally connected to the support arms 46 about a separate vane pivot axis $A_V$ so that each of the rotor vanes 49 may be individually pivoted over a limited range about the vane pivot axes $A_V$ parallel to the rotor axis $A_R$. This allows each of the rotor vanes 49 to be individually positioned relative to the support arms 46 about the vane pivot axes $A_V$.

A vane positioning drive mechanism 50 is provided at the inboard end of the rotor assembly 31 inboard of the inboard support arbor 45 as best seen in FIGS. 3–5 to selectively pivot the rotor vanes 49 about the vane pivot axes $A_V$. The vane positioning drive mechanism 50 includes generally an inner annular race member 51 having an inside diameter $d_1$ which is significantly larger than the outside diameter $d_2$ of the common drive shaft 32 as best seen in FIG. 3. Because of the differences in inside diameter of the race member 51 and outside diameter of the shaft 32, it will be seen that the inner race member 51 can be shifted about the common drive shaft 32 for a limited amount of movement without interference between the race member 51 and the drive shaft 32. The annular race member 51 rotatably mounts thereon just inboard of the inboard support arbor 45 an outer annular positioning ring 52 through bearings 54 between the positioning ring 52 and inner race member 51. This allows the race member 51 to be held rotationally stationary while the outer positioning ring 52 is free to rotate about the inner race member 51 on the bearing 54. The outer positioning ring 52 is pinned to each of the rotor vanes 49 through a positioning link 55 so that the relative pivotal position of the rotor vanes 49 with respect to the vane pivot axes $A_V$ can be controlled by appropriate movement of outer positioning ring 52 by the race member 51. It will be seen that each of the positioning links 55 is pinned to each of the rotor vanes 49 a distance $d_3$ from the vane pivot axis $A_V$ and that each of the positioning links 55 has the same length $L_1$ so that, when the positioning ring 52 is concentric about the rotor axis $A_R$, all of the rotor vanes 49 will have the same relative rotational position about the individual vane pivot axes $A_V$ with each of the vanes 49 being oriented generally normal to a radial line connecting the vane pivot axis $A_V$ with the rotor axis $A_R$. It will further be seen that when the inner race member 51 is moved diametrically of the rotor axis $A_R$, the rotor vanes 49 adjacent one end of this diametrical path of movement will be pivoted in one rotational direction while those rotor vanes 49 adjacent the opposite end of the diametrical path of movement will be pivoted in the opposite direction. In this particular application, it will be seen that the inner race member 51 is provided with a pair of diametrically opposed guide bars 56 extending radially outwardly from the inboard end of the inner race member 51 along diametrically opposed paths. These guide bars 56 are slidably received in a U-shaped guide 58 which is provided with a central upstanding web 59 and outwardly projecting legs 60. The U-shaped guide member 58 is attached to the frame work inside the fuselage 22 and is positioned so that the buide bars 56 are slidably carried in the legs 60 of the U-shaped guide 58 so that the inner race member 51 is diametrically movable with respect to the rotor axis $A_R$ along a diametrical path $P_1$ shown on FIG. 3 which is normal both to rotor axis $A_R$ and the flight axis $A_F$. An appropriate clearance passage 61 is provided through central web 59 of the U-shaped guide 58 through which the common rotor drive shaft 32 concentrically extends so that the shaft 32 can rotate without the U-shaped guide 58 rotating.

A drive mechanism controller 65 is provided for selectively moving the inner race members 51 along the positioning paths $P_1$ to selectively change the rotational position of the rotor vanes 49. The drive mechanism controller 65 includes basically a common drive bar 66 which is connected at its opposite ends with one of the driving projections 68 fixedly mounted on each race member 51. The connections between the drive bar 66 and driving projection 68 are slip-pin joint connections which allow the drive bar 66 to shift with respect to the drive pin 69 on the driving projection 68 as they extend through the slots 70 in opposite ends of the drive bar 66 as will become more apparent. The drive bar 66 is fixedly mounted on a positioning shaft 71 which is in turn rotatably journaled on bearings 72 in a positioning housing 74. The positioning 74 is provided with diametrically opposed guide bars 75 which are in turn mounted on a U-shaped guide 76 fixedly carried by the aircraft frame structure. The U-shaped guide 76 is provided with a central upstanding web 78 and a pair of forwardly projecting legs 79 which slidably receive guide bar 75 therethrough. The U-shaped guide 76 is positioned so that the positioning housing 74 is movable along a path $P_2$ parallel to the inner race member paths $P_1$ and normal to the flight axis $A_F$. It will further be noted that the positioning housing 74 about a positioning axis $A_p$ which is centered between the inner annular race members 51 and oriented generally parallel to the flight axis $A_F$. Thus, the positioning housing 74 can be selectively moved along the path $P_2$ while the positioning shaft 71 can be selectively rotated about the positioning axis $A_p$ independently of the position of the positioning housing 74 along the path $P_2$.

Figure 6:
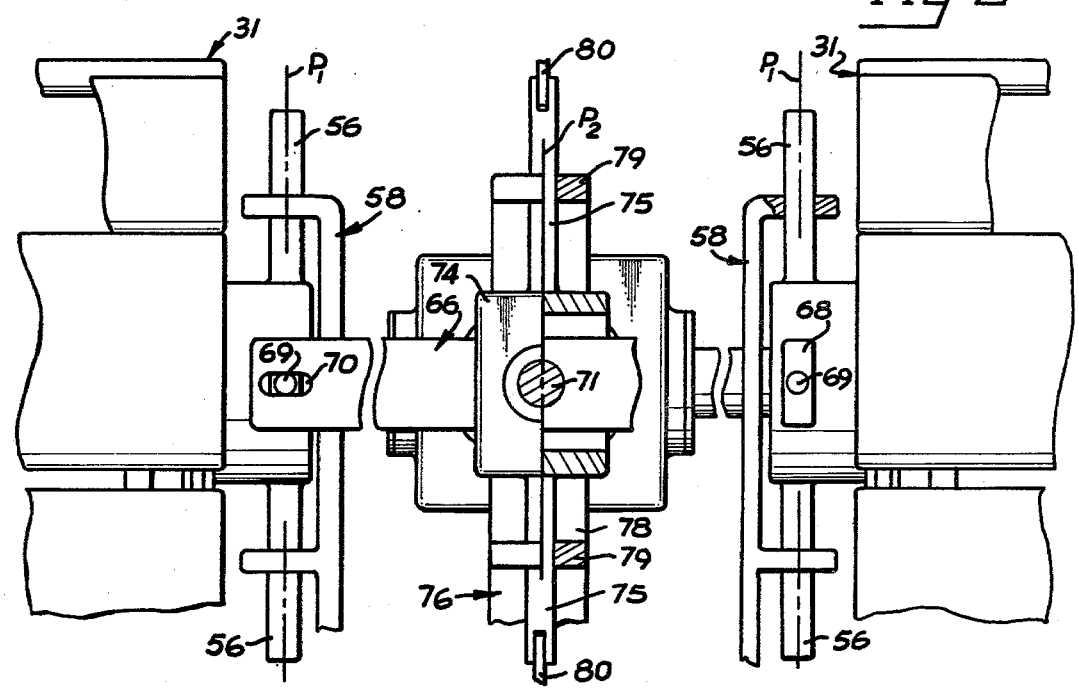
FIG. 6 is a view taken generally along line 6—6 in FIGS. 2 and 5.

The projecting ends of the guide bar 75 are provided with appropriate attachment eyes 80 best seen in FIGS. 2 and 6 so that an appropriate vane attitude control mechanism can be attached to the guide bar 75 to selectively position the positioning housing 74 along the path $P_2$. It will further be noted that, as long as the rotational position of the positioning shaft 71 about the positioning axis $A_p$ remains the same, movement of the positioning housing 74 along the path $P_2$ will cause the same amount of movement of the inner race members 51 in the same direction along the paths $P_1$ to simultaneously change the relative rotational positions of the rotor vanes 49 of each of the rotor assemblies 31 with the vanes 49 of both rotor assemblies 31 being changed in the same manner. On the other hand, if the positioning housing 74 is maintained in the same position along the path $P_2$, rotation of the positioning shaft 71 will cause one of the inner race members 51 to be shifted along the path $P_1$ in one direction while the opposite inner race member 51 will be shifted a like amount in the opposite direction along its path $P_1$. This causes the vanes 49 of one of the rotor assemblies 31 to be shifted directly opposite to the way the vanes 49 of the other rotor assembly 31 is shifted.

Referring now specifically to FIG. 2 and also to FIG. 5, it will be seen that the positioning shaft 71 is controlled from the cockpit 24 by a vane attitude roll control 81. The vane attitude roll control 81 is incorporated in the aircraft aileron control system 82. Usually, the aircraft aileron control system 82 has a drive shaft 84 which mounts the aileron connection 85 to move the ailerons 18 in response to rotation of the drive shaft 84. A transfer shaft 86 connects the drive shaft 84 on the aileron control system to the positioning shaft 71 so that rotation of drive shaft 84 rotates shaft 71. When the aircraft is provided with a control stick 88 in the cockpit 24 as seen in FIG. 2, the drive shaft 84 usually serves as the pivot point for the control stick 88 and is rotated about its axis as the control stick 88 is moved laterally of the flight axis of the airplane. Thus, when the control stick 88 is moved laterally of the flight axis $A_F$ by the pilot, the ailerons 18 will be appropriately pivoted by the aileron connection 85 to cause the plane to bank. At the same time, the movement of the control stick 88 laterally of the flight axis of the aircraft will also cause the positioning shaft 71 to rotate about the positioning axis $A_p$ to correspondingly shift the vanes 49 on the two rotor assemblies 31 in the opposite sense to exert a like banking movement to the aircraft as will become more apparent. Movement of the control stick 88 along the flight axis $A_F$ causes the elevator connection 89 thereon to move the elevator 14 in conventional manner.

A vane attitude lift control 90 is connected to the eyes 80 on the positioning housing 74 to selectively move the positioning housing 74 along the path $P_2$. The vane attitude lift control 90 is best seen in FIG. 2 and includes a vane lift control lever 91 pivotally mounted in the cockpit 24. The vane lift control lever 91 is connected to vane control cable 92 appropriately trained over cable pulleys 94 so that the motion imparted to the vane control cable 92 moves the positioning housing 74 along the path $P_2$. The ends of the cable 92 are connected to the attachment eyes 80 so that movement of the cable in one direction by the control lever 91 will shift the positioning housing 74 along the path $P_2$ in a first direction while the movement of the cable in the opposite direction will shift the positioning housing 74 in the opposite direction. As seen in FIG. 2, pivoting the control lever 91 counterclockwise will raise the positioning housing 74 while pivoting the control lever 91 clockwise will lower the positioning housing 74.

The elevator 14 includes a generally horizontal fixed section 100 as seen in FIGS. 1 and 2 to which is pivoted a movable elevator section 101 as best seen in FIG. 2. The elevator section 101 has a cutout 102 on the underside thereof in which is movably mounted a reversing flap 104. The movable elevator section 101 is controlled in a conventional manner from the elevator connection 89 on the control stick 88. The position of the reversing flap 104 is controlled by an appropriate mechanism such as a screw drive 106 which moves the pivot point of the reversing flap from a forwardmost position as illustrated in solid lines in FIG. 2 to a rearmost position as shown by phantom lines in FIG. 2. The pivotal position of the reversing flap 104 as seen in FIG. 2 is controlled by a fixed length positioning link 105 seen by phantom lines in FIG. 2 when the reversing flap 104 is in its lowered position. The positioning link 105 is pivoted about the fixed pivotal axis $A_{RF}$ so that as the pivotal connection of the reversing flap 104 is shifted rearwardly along the cutout 102, the positioning link 105 causes the reversing flap 104 to pivot downwardly toward the position shown by phantom lines in FIG. 2. This causes the thrust of the propeller to be reversed on the aircraft as will become more apparent.

The operation of the rotor assemblies 31 will be best understood by reference to FIG. 4. As seen in FIG. 4, the inner race member 51 has been shifted downwardly along the path $P_1$ the distance $d_x$. It will further be noted that each of the rotor vanes 49 has an airfoil cross sectional shape with a rounded leading edge 110, with a curvilinear outboard side surface 111, and a generally planar inboard side surface 112 that joins with the outboard side surface 111 to form a relatively sharp trailing edge 114. When the rotor assembly 31 is in its neutral position, as seen in FIG. 3, it will be seen that the planar inboard side surfaces 112 are generally normal to the radius of the drive shaft 32. When the annular inner race member 51 of the vane positioning mechanism 50 is shifted downwardly along path $P_1$ to the position shown in FIG. 4, it will be seen that those vanes 49 extending above the wings 11 will be pivoted clockwise while those vanes 49 projecting below the wings 11 will be pivoted counterclockwise. The vanes 49 passing through the rotor cutout in the wings 11 will generally be in the same position as when the rotor assembly 31 is in its neutral position. Thus, it will be seen that the leading edges 110 of the vanes 49 are pivoted outwardly from the rotor axis $A_R$ as the vanes 49 move above the wings 11 while the leading edges 110 of the vanes 49 will be pivoted inwardly as the vanes 49 pass below the wings 11. This serves to cause the vanes 49 of the rotor assembly 31 to draw air from above the wing into the interior of the rotor assembly 31 and then discharge this air outwardly below the wings 11 as shown by the air flow lines in FIG. 4. The net result is that the air pressure directly above the wing 11 is lowered while the air pressure immediately below the wing 11 is raised since the rotor assemblies 31 are pumping air from above to below the wings 11. This causes a net lifting effect to be imparted to the aircraft due to the pumping action of the rotor assemblies 31. When the rotor assemblies 31 and the vanes 49 are appropriately sized, the lifting effect generated by the rotor assemblies 31 will be sufficient to lift the aircraft 10. Thus, it will be seen that the rotor assemblies 31 give the aircraft 10 a vertical takeoff capability when the vanes 49 are pivoted in the direction shown by solid lines in FIG. 4.

On the other hand, raising the inner race members 51 from the position shown by solid lines in FIG. 4 first through the neutral position seen in FIG. 3 and then toward the reversed position shown by dashed lines in FIG. 4. When the vanes are in the reversed position shown by dashed lines in FIG. 4, the leading edges 110 of the vanes 49 are pivoted inwardly as they pass above wing 11 and pivoted outwardly as they pass below the wing 11 so that air is pumped from below wing 11 through the rotor assembly 31 and then out above wing 11. This serves to reduce the lift on the aircraft in increasing its descent.

On the other hand, raising the inner race members 51 from the position shown by solid lines in FIG. 4 serves to pivot the vanes 49 first through the neutral position seen in FIG. 3 and then toward the reversed position shown by dashed lines in FIG. 4. When the vanes are in the reversed position shown by dashed lines in FIG. 4, the leading edges 110 of the vanes 49 are pivoted inwardly as they pass above wing 11 and pivoted outwardly as they pass below the wing 11 so that air is pumped from below wing 11 through the rotor assembly 31 and then out above wing 11. This serves to reduce the lift on the aircraft in increasing its descent.

The pilot is able to control the position of the vanes 49 to simultanously increase and decrease the lift of both rotor assemblies 31 using the lift control lever 91. As seen in FIG. 2, rotation of lever 91 clockwise will increase lift while rotation of lever 91 counterclockwise decreases lift. Because the control stick 88 also controls the rotational position of the positioning shaft 71 through the vane attitude roll control 81, the pilot moves the control stick 88 laterally of the flight axis $A_F$ to vary the relative between the rotor assemblies 31. This allows the pilot to control the roll attitude of the aircraft about the flight axis $A_F$.

To use the vertical takeoff capability of the aircraft 10, the pilot starts the engine 25 and engages the rotor transmission as well as the propeller transmission 26. The rotor assemblies 31 are now being rotated in the direction shown in FIGS. 3 and 4 so that the vanes 49 have a forward component of motion as they pass above the wings 11. The propeller 15 will probably be of the variable pitch type and will usually be set at about the neutral position. The pilot then moves the lift control lever 91 clockwise as seen in FIG. 2 to pivot the vanes 49 toward their maximum lift position shown by solid lines in FIG. 4. As the engine 25 is speeded up, the rotor assemblies 31 generate a lift on the aircraft 10 to lift it off the ground. The roll attitude of the aircraft is controlled by the pilot by appropriately shifting the control stick 88 laterally of the flight axis $A_F$. The pitch attitude of the aircraft about the rotor axis $A_R$ is controlled by the pilot by adjusting the pitch of the propeller 15 in known manner and by adjusting the position of the elevator 14 with fore and aft movement of the control stick 88. Lowering the elevator section 101 raises the rear end of the aircraft while raising section 101 lowers the rear end of the aircraft. When the rotor axis $A_R$ is located forwardly of the center of gravity CG of the aircraft as seen in FIG. 2, the pitch of the propeller 15 and the position of elevator 14 is adjusted so that the force of the air from propeller 15 against the elevator 14 serves to lift the rear end of the aircraft. The pilot can also adjust the fore and aft movement of the aircraft by adjusting the position of the reversing flap 104. Thus, it will be seen that the aircraft can lift off the ground vertically, hover or move forwardly or rearwardly while hovering. The yaw attitude of the aircraft about the yaw axis $A_y$ in FIG. 1 is controlled by the pilot by adjusting the pitch of the propeller 15 and the position of rudders 19.

When the aircraft has been lifted off the ground, the pilot can transfer gradually into full forward flight by increasing the pitch of the propeller 15. The rotor assemblies 31 continue to supply the lift necessary to maintain the aircraft airborne. As the aircraft gradually accelerates toward full flying speed, the lift setting of the vanes 49 can be gradually lowered by rotating the lift control lever 91 back toward its neutral position so that the vanes 49 reach their neutral position after the aircraft has reached full flying speed. Once the aircraft has reached full flying speed, the rotor assemblies can be disengaged from the engine 25 by rotor transmission 34 and stopped or allowed to free wheel. If the rotor assemblies 31 are allowed to free wheel, the greater exposure below the wings 11 will continue to rotate the rotor assemblies 31 in the direction shown in FIGS. 3 and 4. At full flying speed, the aircraft operates generally conventionally. For a vertical landing, the process is reversed.

If a loss of power in the engine 25 is experienced, the rotor assemblies 31 can be used to assist in the safe landing of the aircraft. If the rotor assemblies 31 are free wheeling sufficiently fast, the pilot can move the vanes 49 toward the lift position as the aircraft slows and use the rotational momentum of the rotor assemblies 31 to create the necessary lift to allow the aircraft to land at a slow speed or vertically. If sufficient altitude is available and the rotor assemblies 31 are not free wheeling fast enough, the pilot can speed up the rotation of the rotor assemblies by moving the lift control lever 91 toward its descent position to pivot the vanes 49 toward their descent positions shown by dashed lines in FIG. 4. The force of the air flowing from below the wings 11 through the rotor assemblies 31 to above the wings 11 speeds up the rotation of the rotor assemblies 31 to increase their rotational momentum. Then, as the aircraft approaches the ground, the vanes 49 can be shifted to their lift positions to cause the rotational momentum to create the necessary lift to allow the aircraft to safely land.

SECOND EMBODIMENT

A second embodiment of an aircraft embodying the invention is seen in FIGS. 7 and 8. The aircraft is designated generally by the numeral 210 and is designed for much higher speeds than aircraft 10. The aircraft 210 has a pair of forward wings 211 and a pair of aft wings 212. A vertical stabilizer 214 is provided between the aft wings 212 and a pair of elevators 215 are provided in exhaust cutouts 216 in the trailing portions of the aft wings 212. The vertical stabilizer 214 is provided with high and low speed rudders 218 and 219 while the trailing edges of the aft wings 212 are provided with ailerons 220. The aircraft 210 has a fuselage 221 with a forward cockpit section 222 that carries the pilot and a trailing propulsion section 224 which mounts the power plant. The upper and lower surfaces 225 and 226 of the propulsion section 224, while not shown as such, may be aerodynamically curved to generate lift. A pair of propulsion jet engines 228 are provided in the aft end of the propulsion section 224 of the fuselage and discharges the exhaust gases rearwardly therefrom over the elevators 215 in cutouts 216. The intakes to the engines 228 are connected to ducts 229 opening onto the leading end of the propulsion section 224 of the fuselage to supply air to the engines 228.

The lift augmenting device 230 is operatively communicating with the ducts 229 and with the air below the aircraft. The lift augmenting device 230 has a pair of rotor assemblies 231 mounted on common rotor shaft 232. The rotor assemblies 231 have the same construction as the rotor assemblies 31, and the specific construction thereof will not be repeated here. Also, because the controls for the rotor assemblies 231 is the same as the controls for the rotor assemblies 31, their description will not be repeated. The common drive shaft 232 is driven by a fluid motor 234 powered by a bleed line from engines 228 rather than by a direct drive. The rotor drive shaft 232 is oriented on a rotor axis $A_R$ normal to the longitudinal flight axis $A_F$ of the aircraft. The rotor assemblies 231 are mounted in a pair of rotor cutouts 235 which extend from each duct 229 out through the bottom of the propulsion section 224 of the fuselage 221 so that the rotor assemblies 231 pump air back and forth between the ducts 229 and the bottom of the aircraft in accordance with the operation described for rotor assemblies 31. The bottom of cutouts 235 below the rotor assemblies 231 can be selectively opened and closed by a set of shutter vanes 236 pivoted about axes generally normal to the rotor axis $A_R$ and parallel to the flight axis $A_F$.

The exposure of the rotor assemblies 231 to the air below the aircraft can also be regulated by pairs of pivotable gates 238 on the forward and trailing edges of the cutouts 235. The gates 238 are shown in their lowered positions by solid lines in FIG. 8 and in their raised positions by phantom lines.

The forwardly facing intake openings 240 to ducts 229 are provided with closure doors 241 which can be pivoted from an open position shown by dashed lines in FIG. 7 to a closed position shown by phantom lines in FIG. 7 to prevent the flow of air into the ducts 229 through the intake openings 240. The propulsion section 224 of fuselage 221 is provided with a pair of intake cutouts 242 from the top of the aircraft 210 to the ducts 229 over the rotor assemblies 231. The cutouts 242 are selectively closed by intake shutter assemblies 244 with shutter vanes 245 pivoted about vane axes normal to the flight axis $A_F$ and parallel to the rotor axis $A_R$. This allows the rotor assemblies 231 to communicate with the air above the aircraft as will become more apparent.

The forward wings 211 are pivoted about axes $A_W$ normal to the flight axis $A_F$ and parallel to the rotor axis $A_R$. This allows the forward wings 211 to also act as ailerons to assist in controlling the banking of the aircraft. Each of the movable wings 211 is provided with upwardly and downwardly directed jet nozzles 249 that pivot with the wings 211 supplied with air from engines 228 to selectively generate a thrust from each to selectively control the roll attitude of the aircraft about flight axis $A_F$ in combination with similar jet nozzles 250 in the aft wings 212 and jet nozzles 251 in the vertical stabilizer 214. The jet nozzles 249 in the movable forward wings 211 can also be used to stabilize the aircraft forwardly and rearwardly along the flight axis $A_F$ by rotating wings 211.

The elevators 215 are each provided with a fixed section 255 and a movable section 256 similarly to elevator 14 on aircraft 10. The movable sections 256 are also provided with reversing flaps 258 similar to elevator 14. The elevators 215 operate similarly to the elevator 14.

In operation, it will be seen that the second embodiment of the invention also has the vertical takeoff and landing capability similar to the first embodiment. When the aircraft 210 is to be started from a vertical takeoff position, it will be seen that the rotor assemblies 231 will be operated by the pilot from the pilot cockpit similarly to the rotor assemblies 31 in the first embodiment aircraft 10. When this occurs, the rotor assemblies 231 will be pumping air from within the ducts 229 out through the bottom of the aircraft since the shutter vanes 236 below the rotor assemblies 231 are in their open position. In order to impress the pressure differential across the aircraft itself, the pilot, through appropriate controls, opens the shutter vanes 245 in intake shutter assemblies 244 closing cutouts 242 in the top of the propulsion section 224 while operating an appropriate closure mechanism to pivot the closure doors 241 at the intake opening 240 to ducts 229 to the position shown by phantom lines in FIG. 7 so that the closure doors 221 close the intake opening 240. This places the air above the propulsion section 224 of the aircraft 210 in communication with the intake to the rotor assemblies 231 so that the air is now pumped from above the aircraft to below the aircraft by the rotor assemblies 231 to generate a lift on the aircraft. Where the rotor assemblies 231 are located forwardly of the center of gravity CG of the aircraft 210 as illustrated in FIG. 8, the thrust generated by the jet engines 228 will be adjusted against the movable sections 256 of the elevators 215 so as to lift the rear end of the aircraft 210. This will cause the aircraft to lift vertically for a vertical takeoff. The attitude of the aircraft can be adjusted by appropriately manipulating the rotor assemblies 231 in the manner explained for the first embodiment, and in addition, can be controlled using the jet nozzles 249 in the forward wings 211 and the jet nozzles 250 in the aft wings 212. It will be noted that the jet nozzles 249 and 250 are connected to appropriate air bleed lines from the engines 228 and are provided with appropriate valves so that the pilot can control the thrust generated by the air flowing through the jet nozzles from the cockpit section 222 of the aircraft. The yaw attitude of the aircraft can be controlled using the low speed rudder 19 in the vertical stabilizer 214 in a manner described for the first embodiment of the invention and, in addition, by using the jet nozzles 251 in the vertical stabilizer 214 which is also connected by appropriate bleed lines and values to the jet engines 228. The reversing flap 258 is used in a manner similar to that described for the first embodiment of the invention. The forward wings 211 may be rotated about their axes $A_W$ so that the jet nozzles 249 therein can be used to control the fore and aft movement of the aircraft 210 along the flight axis $A_F$. After takeoff, the pilot can increase the thrust on the jet engines 228 and start propelling the aircraft forwardly along the flight axis $A_F$. As the speed of the aircraft increases so that the fore and aft wings 211 and 212 start producing lift, the pilot can vary the setting on the rotor assemblies 231 to reduce the airflow therethrough and/or can start opening the closure doors 241 closing the intake to the ducts 229 so that the air starts passing through the ducts to the intakes on the jet engines 228. As the shutter vanes 245 in the shutter assembly 244 are moved toward a closed position, the intake of the air from above the aircraft into the ducts 229 can be regulated. When full forward flying speed is reached, the shutter vanes 245 can be completely closed as well as the shutter vanes 236 below the rotor assemblies 231 and the rotor assemblies 231 stopped from rotating or rotated in a neutral position so that aircraft operates relatively conventionally. Because of the aerodynamic inside shape of the ducts 229, it may be desirable to not fully close the intake shutter vanes 245 so that air is continued to be drawn into ducts 229 through the shutter assemblies 244 as well as through the intake openings 240 to the ducts 229. By leaving the shutter vanes 245 partly open, it will be seen that the flow pattern of the air through the ducts 229 can be more accurately controlled to maximize the amount of intake air passing into the intakes of the jet engines 228 from the ducts 229. To make a vertical landing with the aircraft 210, it will be seen that the procedure described will be reversed so that the forward flight of the aircraft along the flight axis $A_F$ can be slowed and eventually stopped with the rotor assemblies 231 again supporting the weight of the aircraft for landing.

If a failure of the engines 228 is experienced, the rotor assemblies 231 can be manipulated similarly to that described for the first embodiment of the invention to speed up the free wheeling rotation of the rotor assemblies 231 to store sufficient rotational momentum therein to allow the rotor assemblies 231 to be reversed just prior to landing and permit safe landing of the aircraft. When this occurs, the gates 238 will usually be opened to increase the exposure of the rotor assemblies 231 to the air below the aircraft so as to rotate the rotor assemblies 231 sufficiently fast to store the required amount of rotational momentum to permit a safe landing.

I claim:

1. A lift augmenting device for an aircraft having a longitudinally flight axis along which the aircraft flies and a pilot cockpit and defining a pair of air intake ducts therein having forwardly facing air intakes thereto on opposite sides of the aircraft flight axis, said lift augmenting device comprising:

a pair of rotor assemblies positioned on opposite sides of the aircraft flight axis and rotatable about a common horizontal rotor axis generally normal to the aircraft flight axis, both of said rotor assemblies communicating with the air above and below the aircraft, one of said rotor assemblies operatively communicating with each of said air intake ducts for pumping air from within said intake duct through said rotor assembly to below the aircraft, each of said rotor assemblies including:

a plurality of rotor vanes circumferentially spaced about and rotatable with said rotor assembly, each of said rotor vanes individually pivoted about an individual vane pivot axis generally parallel to said rotor axis;

closure means for selectively closing each of said air intakes to said air intake ducts;

louver means for selectively connecting each of said air intake ducts to the air above the aircraft; and vane control means for selectively controlling said rotor vanes on both of said rotor assemblies as said rotor vanes rotate with said rotor assemblies about said rotor axis to selectively change the lift imparted to the aircraft by said rotor assemblies; said vane control means including:

a pair of positioning drive mechanisms, one of said positioning drive mechanisms operatively associated with said rotor vanes of each of said rotor assemblies and including an inner race member rotatably fixed with respect to said common rotor axis and diametrically movable with respect to said common rotor axis along a positioning path generally normal to said rotor axis and the aircraft flight axis, an outer positioning ring rotatably mounted on said inner race member for rotation about said inner race member with said rotor assembly associated therewith, and a plurality of positioning links connecting said outer positioning ring individually with each of said rotor vanes on said rotor assembly so that shiting said inner race member along its positioning path causes said rotor vanes in communication with the air above the aircraft to pivot individually about their respective individual vane pivot axes in one pivotal direction while simultaneously causing said rotor vanes in communication with the air below the aircraft to pivot about their individual pivot axes in the opposite pivotal direction to selectively change the amount of air pumped from about the aircraft to below the aircraft and thereby change the lift imparted to the aircraft by said rotor means; and a common drive mechanism controller operatively connecting said inner race members to selectively position said inner race members along their respective said positioning paths, said drive mechanism including first vane attitude control means selectively operated from the pilot cockpit for simultaneously moving both of said inner race members along said positioning paths in the same direction and second vane attitude control means selectively operated from the pilot cockpit for simultaneously moving said inner race members along their respective said positioning paths in opposite directions, said second vane attitude control means moving said inner race members independently of said first attitude control means.

2. A lift augmenting device for an aircraft having a longitudinal flight axis along which the aircraft flies and a pilot cockpit; defining a pair of air intake ducts therein on opposite sides of the aircraft flight axis having forwardly facing air intakes thereto and a rear end; and including forward propulsion means operatively associated with the rear ends of the air intake ducts for generating forward thrust to propel the aircraft forwardly along the aircraft flight axis; said lift augmenting device comprising:

a pair of rotor assemblies positioned on opposite sides of the aircraft flight axis and rotatable about generally horizontal rotor axes, one of said rotor assemblies communicating with each of said air intake ducts between the air intake thereto and the rear end thereof and with the air below the aircraft so that each rotor assembly can selectively pump air from within the duct to below the aircraft;

closure means for selectively closing the air intakes to the air intake ducts; and louver means for selectively connecting each of the air intake ducts between the air intake thereto and the rear end thereof to the air above the aircraft so that, when said closure means closes the air intakes and said louver means connects the air intake ducts to the air above the aircraft, said rotor assemblies can pump air from above the aircraft through the air intake ducts to below the aircraft to generate lift on the aircraft.

3. The lift augmenting device of claim 2 wherein the center of gravity of the aircraft is located rearwardly of the lift forces generated by said rotor assemblies so that the rear end of the aircraft is urged downwardly when said rotor assemblies lift the aircraft and further including elevator flap means operatively associated with the forward thrust generating gas stream from the forward propulsion means so that said elevator flap means cooperates with the forward thrust generating gas stream to selectively impart a lifting force to the aircraft rearwardly of the center of gravity to assist in keeping the aircraft level during lifting.

4. The lift augmenting device of claim 3 wherein each of rotor assemblies includes a plurality of rotor vanes circumferentially spaced about and rotatable with said rotor assembly about said rotor axis, each of said rotor vanes oriented generally parallel to said rotor axis and individually pivoted about an individual vane pivot axis generally parallel to said rotor axis; and vane control means operated from the pilot cockpit for selectively and individually pivoting each of said rotor vanes about its individual vane pivot axis as said rotor vanes rotate with said rotor means about said rotor axis to selectively change the lift imparted to the aircraft by said rotor assemblies.

5. A lift augmenting device for an aircraft having a longitudinal flight axis along which the aircraft flies, a pilot cockpit, a pair of generally horizontally oriented, opposed aerodynamic wings for lifting the aircraft when in forward flight along the flight axis, and forward propulsion means for generating forward thrust to propel the aircraft forwardly along the aircraft flight axis; said lift augmenting device comprising:

a generally vertically oriented rotor cutout defined through each of said wings;

a pair of rotor assemblies, one of said rotor assemblies rotatably mounted in each of said rotor cutouts about a generally horizontal rotor axis, each of said rotor assemblies projecting out of said cutout above the wing and below the wing so that said rotor assembly communicates with the air above the wing and the air below the wing; each of said rotor assemblies including a plurality of rotor vanes circumferentially spaced about said rotor assembly, each of said rotor vanes individually pivoted about a vane pivot axis generally parallel to said rotor axis; said rotor vanes spaced from said rotor axis so that each of said rotor vanes extends above the wing during a first portion of the rotation of said rotor vane about said rotor axis and extends below the wing during a second portion of the rotation of said rotor vane about said rotor axis; and vane control means operated from the pilot cockpit for slectively pivoting each of said rotor vanes about its individual vane pivot axis as said rotor vanes rotate with said rotor assemblies, said vane control means including a pair of positioning drive mechanisms, one of said positioning drive mechanisms operatively associated with said rotor vanes of each of said rotor assemblies and each of said positioning drive mechanisms comprising:

an inner race member rotatably fixed with respect to said common rotor axis and diametrically movable with respect to said common rotor axis only along a positioning path generally normal to said rotor axis and the aircraft flight axis, an outer positioning ring rotatably mounted on said inner race member for rotation about said inner race member with said rotor assembly associated therewith and for movement with said inner race member along said positioning path, and a plurality of positioning links connecting said outer positioning ring individually with each of said rotor vanes on said rotor assembly so that shifting said inner race member upwardly along its positioning path causes said rotor vanes to be pivoted while moving above the wing to force air from above the wing into said rotor assembly, to be pivoted to a substantially neutral position while moving through said rotor cutout through the wing, and to be pivoted while moving below the wing to force air from within said rotor assembly to below the wing to generate only generally vertically oriented lift forces tending to lift the aircraft, the amount said rotor vanes are pivoted above and below the wing selectively variable by the amount of upward shifting of said inner race along its positioning path, said vane control means further including a common drive mechanism controller operatively connecting said inner race members to selectively position said inner race members along their respective said positioning paths, said common drive mechanism operated from the pilot cockpit to selectively control the vertical lift on the aircraft by said rotor assemblies so that the vertical lift for the aircraft is provided by said rotor assemblies unit while the aircraft is moved sufficiently fast along its longitudinal flight axis by the forward propulsion means for the lift generated by the aerodynamic wings to keep the aircraft airborne.

6. The lift augmenting device of claim 5 wherein said drive mechanism controller includes first vane attitude control means selectively operated from the pilot cockpit for simultaneously moving both of said inner race members along said positioning paths in the same direction and second vane attitude control means selectively operated from the pilot cockpit for simultaneously moving said inner race members along their respective said positioning paths in opposite directions, said second vane attitude control means moving said inner race members independently of said first attitude control means.

7. The lift augmenting device of claim 5 wherein the center of gravity of the aircraft is located rearwardly of the lift forces generated by said rotor assemblies so that the rear end of the aircraft is urged downwardly when said rotor assemblies lift the aircraft and further including elevator flap means operatively associated with the forward thrust generating gas stream from the forward propulsion means so that said elevator flap means cooperates with the forward thrust generating gas stream to selectively impart a lifting force to the aircraft rearwardly of the center of gravity to assist in keeping the aircraft level during lifting.

8. The lift augmenting device of claim 5 further including power means for rotating said rotor assemblies in a direction so that said rotor vanes move forwardly with respect to the flight axis as said rotor vanes project above said wing and move rearwardly with respect to the flight axis as said rotor vanes project below said wing so that forward motion of the aircraft along its flight axis increases rather than decreases the pumping efficiency of said rotor assemblies generating vertical lifting forces on the aircraft.

9. The lift augmenting device of claim 8 wherein each of said rotor assemblies project below the wing a distance greater than the distance said rotor assembly projects above the wing so that, when said rotor vanes are adjusted to a neutral position completely around said rotor assembly, the air drag on said rotor assemblies while the aircraft is moving forwardly along its flight axis tends to rotate said rotor assemblies in the same rotational direction as when powered by said power means.

* * * * *